(12) United States Patent
Savolainen et al.

(10) Patent No.: US 10,922,675 B2
(45) Date of Patent: Feb. 16, 2021

(54) REMOTE TRANSACTION SYSTEM, METHOD AND POINT OF SALE TERMINAL

(71) Applicant: iAxept Limited, London (GB)

(72) Inventors: Risto Savolainen, London (GB); Stephane Jayet, London (GB)

(73) Assignee: HILLOA LIMITED, London (GB)

( * ) Notice: Subject to any disclaimer, the term of this patent is extended or adjusted under 35 U.S.C. 154(b) by 624 days.

(21) Appl. No.: 15/129,308

(22) PCT Filed: Mar. 24, 2015

(86) PCT No.: PCT/GB2015/050869
§ 371 (c)(1),
(2) Date: Sep. 26, 2016

(87) PCT Pub. No.: WO2015/145131
PCT Pub. Date: Oct. 1, 2015

(65) Prior Publication Data
US 2017/0178116 A1    Jun. 22, 2017

Related U.S. Application Data

(63) Continuation of application No. 14/224,461, filed on Mar. 25, 2014.
(Continued)

(30) Foreign Application Priority Data

Mar. 3, 2015 (GB) .................................. 1503586.8

(51) Int. Cl.
*G06Q 20/32* (2012.01)
*G06Q 20/20* (2012.01)
(Continued)

(52) U.S. Cl.
CPC ......... *G06Q 20/3227* (2013.01); *G06Q 20/20* (2013.01); *G06Q 20/202* (2013.01);
(Continued)

(58) Field of Classification Search
CPC .. G06Q 20/3221; G06Q 20/20; G06Q 20/202; G06Q 20/3227; G06Q 20/3229;
(Continued)

(56) References Cited

U.S. PATENT DOCUMENTS 6,240,091 B1    5/2001  Ginzboorg et al.
6,877,093 B1    4/2005  Desai et al.
(Continued)

FOREIGN PATENT DOCUMENTS

WO   WO-2008063990 A2 *  5/2008  ......... G06Q 20/0855
WO   2010/128442 A2     11/2010

OTHER PUBLICATIONS

Steffens, Ernst-Joachim, et al. "The SIM-based mobile wallet." 2009 13th international conference on intelligence in next generation networks. IEEE, 2009.*
(Continued)

*Primary Examiner* — Asfand M Sheikh
(74) *Attorney, Agent, or Firm* — Nixon & Vanderhye

(57) ABSTRACT

A remote transaction processing system, method and point of sale terminal are disclosed. The system includes a first data store, which includes a user device profile for a user device, the user device profile including routing data for routing communications to the user device. Upon receiving a payment request designating a user device for a transaction with a merchant, the remote transaction processing system is arranged to retrieve a Point-of-Sale, PoS, configuration profile corresponding to the merchant and retrieve the user device profile from the first data store corresponding to the designated user device. The remote transaction processing
(Continued)

system is arranged to communicate a PoS configuration dependent on the PoS configuration profile to the user device in dependence on the routing data, the PoS configuration being executable by the user device to cause the user device to act as a PoS terminal for the transaction with the merchant.

16 Claims, 6 Drawing Sheets

Related U.S. Application Data

(60) Provisional application No. 61/804,773, filed on Mar. 25, 2013.

(51) Int. Cl.
 G06Q 20/38 (2012.01)
 G06Q 20/36 (2012.01)

(52) U.S. Cl.
 CPC ....... G06Q 20/327 (2013.01); G06Q 20/3221 (2013.01); G06Q 20/3229 (2013.01); G06Q 20/363 (2013.01); G06Q 20/3821 (2013.01); G06Q 20/3829 (2013.01); G06Q 20/322 (2013.01)

(58) Field of Classification Search
 CPC ............... G06Q 20/327; G06Q 20/363; G06Q 20/3821; G06Q 20/3829; G06Q 20/322
 See application file for complete search history.

(56) References Cited

U.S. PATENT DOCUMENTS

| | | | | |
|---|---|---|---|---|
| 7,096,193 | B1* | 8/2006 | Beaudoin | G06Q 10/06311 705/26.1 |
| 8,321,285 | B1* | 11/2012 | Hurst | G06Q 40/02 705/21 |
| 8,406,809 | B2 | 3/2013 | Florek et al. | |
| 8,498,900 | B1* | 7/2013 | Spirin | G06Q 50/00 340/286.09 |
| 8,583,493 | B2 | 11/2013 | Florek et al. | |
| 8,606,711 | B2 | 12/2013 | Florek et al. | |
| 8,751,316 | B1* | 6/2014 | Fletchall | G06Q 20/322 705/20 |
| 9,195,982 | B2* | 11/2015 | Orr | G06Q 20/204 |
| 9,898,719 | B2* | 2/2018 | Godsey | G06Q 20/08 |
| 2002/0095310 | A1* | 7/2002 | Kobayashi | G06F 9/4411 713/1 |
| 2006/0224470 | A1 | 10/2006 | Garcia Ruano et al. | |
| 2007/0106564 | A1* | 5/2007 | Matotek | G06Q 20/20 705/26.1 |
| 2008/0147552 | A1* | 6/2008 | Morsillo | G06Q 20/102 705/44 |
| 2008/0268811 | A1 | 10/2008 | Beenau et al. | |
| 2009/0063312 | A1* | 3/2009 | Hurst | G06Q 20/105 705/30 |
| 2010/0211495 | A1* | 8/2010 | Zanzot | G06Q 20/04 705/37 |
| 2010/0250437 | A1 | 9/2010 | Goeller et al. | |
| 2010/0274677 | A1* | 10/2010 | Florek | G06Q 20/10 705/16 |
| 2011/0021175 | A1 | 1/2011 | Florek et al. | |
| 2011/0022482 | A1 | 1/2011 | Florek et al. | |
| 2011/0112968 | A1* | 5/2011 | Florek | G06Q 20/20 705/50 |
| 2011/0153437 | A1* | 6/2011 | Archer | G06Q 20/10 705/17 |
| 2011/0196782 | A1* | 8/2011 | Allen | G06Q 20/10 705/39 |
| 2011/0251892 | A1* | 10/2011 | Laracey | G06Q 30/0253 705/14.51 |
| 2012/0028609 | A1* | 2/2012 | Hruska | H04L 63/083 455/411 |
| 2012/0150750 | A1* | 6/2012 | Law | G06Q 20/20 705/76 |
| 2012/0158528 | A1* | 6/2012 | Hsu | G06Q 20/20 705/16 |
| 2012/0203605 | A1* | 8/2012 | Morgan | H04W 12/06 705/14.17 |
| 2012/0203665 | A1* | 8/2012 | Morgan | H04W 12/06 705/26.41 |
| 2012/0284130 | A1* | 11/2012 | Lewis | G06Q 20/00 705/16 |
| 2012/0284131 | A1* | 11/2012 | Soffer | G06Q 20/3278 705/17 |
| 2012/0284193 | A1 | 11/2012 | Bharghavan et al. | |
| 2012/0290421 | A1* | 11/2012 | Qawami | G06Q 20/20 705/21 |
| 2013/0054336 | A1* | 2/2013 | Graylin | H04L 67/02 705/14.26 |
| 2013/0226722 | A1 | 8/2013 | Barrera et al. | |
| 2014/0006183 | A1* | 1/2014 | Grigg | G06Q 20/20 705/16 |
| 2014/0006194 | A1 | 1/2014 | Xie et al. | |
| 2014/0013406 | A1* | 1/2014 | Tremlet | G06F 21/32 726/5 |
| 2014/0058953 | A1 | 2/2014 | Florek et al. | |
| 2014/0074637 | A1* | 3/2014 | Hammad | G06Q 20/12 705/21 |
| 2014/0101036 | A1* | 4/2014 | Phillips | G06Q 20/027 705/39 |
| 2014/0143107 | A1* | 5/2014 | Kim | G06Q 30/0207 705/35 |
| 2015/0025989 | A1 | 1/2015 | Dunstan | |
| 2015/0310421 | A1* | 10/2015 | Xie | G06Q 20/3278 705/44 |

OTHER PUBLICATIONS

Wikipedia: "Credit card terminal", Internet Article, Mar. 14, 2014 (Mar. 14, 2014), XP055193148, Retrieved from the Internet: URL: https://en.wikipedia.org/w/index.php?title=Credit_card_terminal &oldid=599603358 [retrieved on Jun. 2, 2015].
Sarah Perez: "Charge Anywhere Makes Nexus S an NFC Terminal", Internet Article, Mar. 28, 2011 (Mar. 28, 2011), XP055178768, Retrieved from the Internet: URL:http://readwrite.com/2011/03/28/ Charge_Anywhere_makes_nexus_s_an_nfc_terminal [retrieved on Mar. 24, 2015].
MasterCard: "MasterCard Best Practices for Mobile Point of Sale Acceptance—A Guide to Enabling Acceptance on Mobile Devices", Internet Article, Nov. 22, 2013 (Nov. 22, 2013), XP055193367, Retrieved from the Internet: URL: http://www.mastercard.com/ corporate/_assets/img/features/MasterCard_Mobile_Point_Of_Sale_ Best_Practices.pdf [retrieved on Jun. 3, 2015].
Herminia Suarez: "Charge Anywhere Achieves MasterCard Mobile Point-of-Sale Program (MPOS) Compliance for EMV MPOS Solution", Internet Article, May 21, 2013 (May 21, 2013), XP055193604, Retrieved from the Internet: URL:http://www.reuters.com/article/ 2013/05/21/nj-charge-anywhere-idUSnBw216749a+100+ BSW20130521 [retrieved on Jun. 3, 2015].
MasterCard: "Mobile POS Self-certified Solution Providers", Internet Article, Nov. 26, 2013 (Nov. 26, 2013), XP055193601, Retrieved from the Internet: URL:http://www.mastercard.com/corporate/_ assets/img/features/MPOSApprovedSolutions.pdf [retrieved on Jun. 3, 2015].
Wikipedia: "Public key infrastructure", Internet Article, Mar. 24, 2014 (Mar. 24, 2014), XP055193186, Retrieved from the Internet: URL:https://en.wikipedia.org/w/index.php?title=Public_key_ infrastructure&oldid=601049646 [retrieved on Jun. 2, 2015].
Josef Langer, et al.: "Anwendungen und Technik von Near Field Communication (NFC)", In: "Anwendungen und Technik von Near Field Communication (NFC)", Sep. 16, 2010 (Sep. 16, 2010), Springer Berlin Heidelberg, Berlin, Heidelberg, XP055178840, ISBN: 978-3-64-205497-6.

(56) References Cited

OTHER PUBLICATIONS

International Search Report, dated Jun. 15, 2015, from corresponding PCT Application.
Office Action dated Aug. 30, 2018 in U.S. Appl. No. 14/224,461.
Office Action dated Aug. 17, 2017 in U.S. Appl. No. 14/224,461.
Office Action dated Oct. 27, 2016 in U.S. Appl. No. 14/224,461.
Office Action in U.S. Appl. No. 14/224,461 dated May 8, 2019.
Non-Final Office Action issued in U.S. Appl. No. 14/224,461.
Final Office Action issued in U.S. Appl. No. 14/224,461 dated Jul. 15, 2020.
Notice of References Cited issued in U.S. Appl. No. 14/224,461 dated Jul. 15, 2020.
"Mobile acquiring services and mini-terminals in Russia—it's time to accept Visa and MasterCard," published on the internet portal "HABR" on Aug. 23, 2013—https://habrcom/ru/post/191196/.
Office Action issued in Indian Patent Application No. 201617036423 dated Nov. 10, 2020.

\* cited by examiner

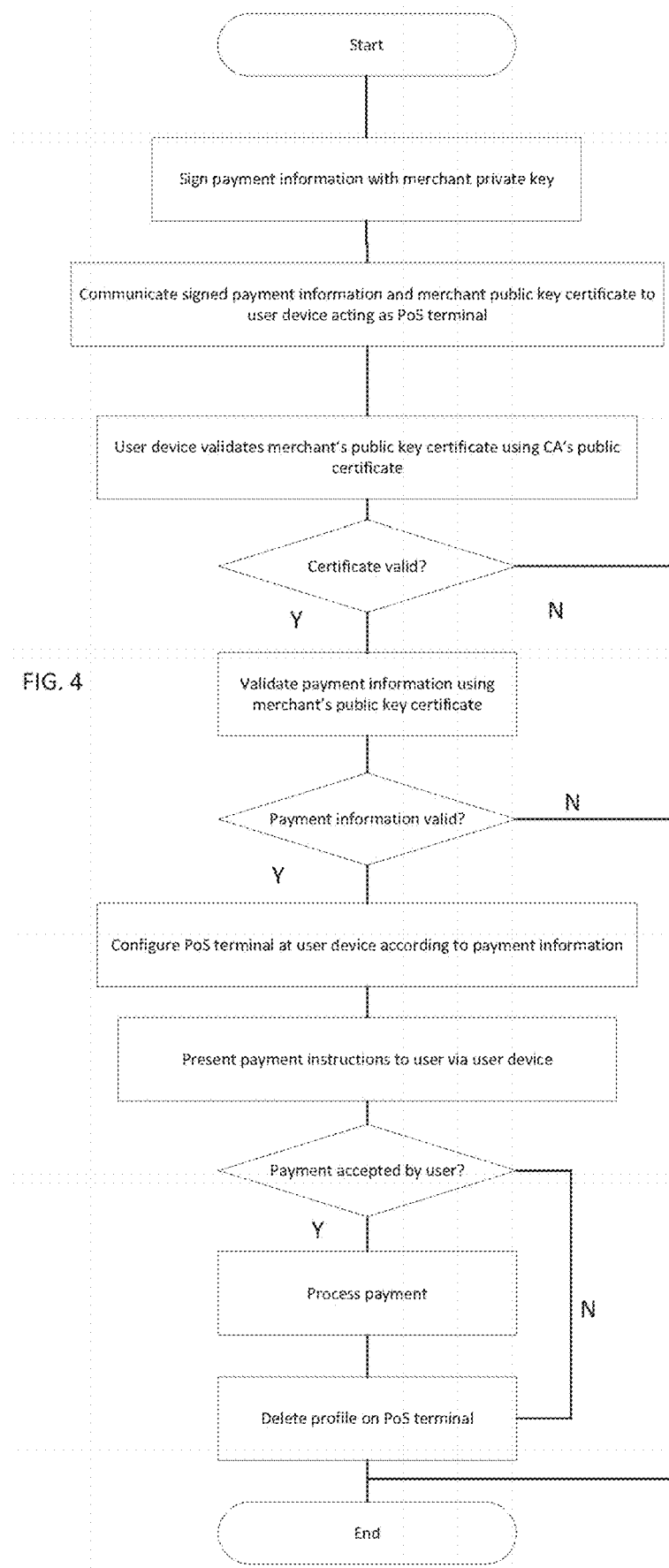

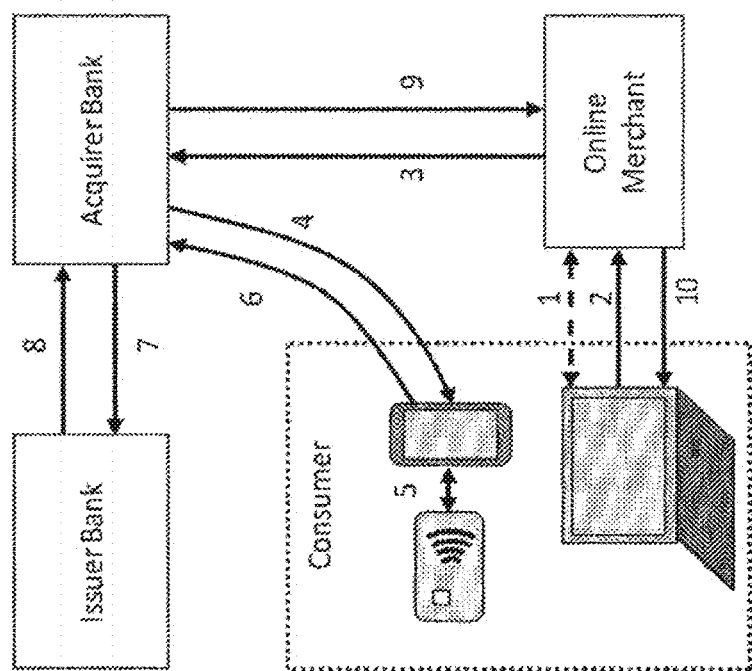

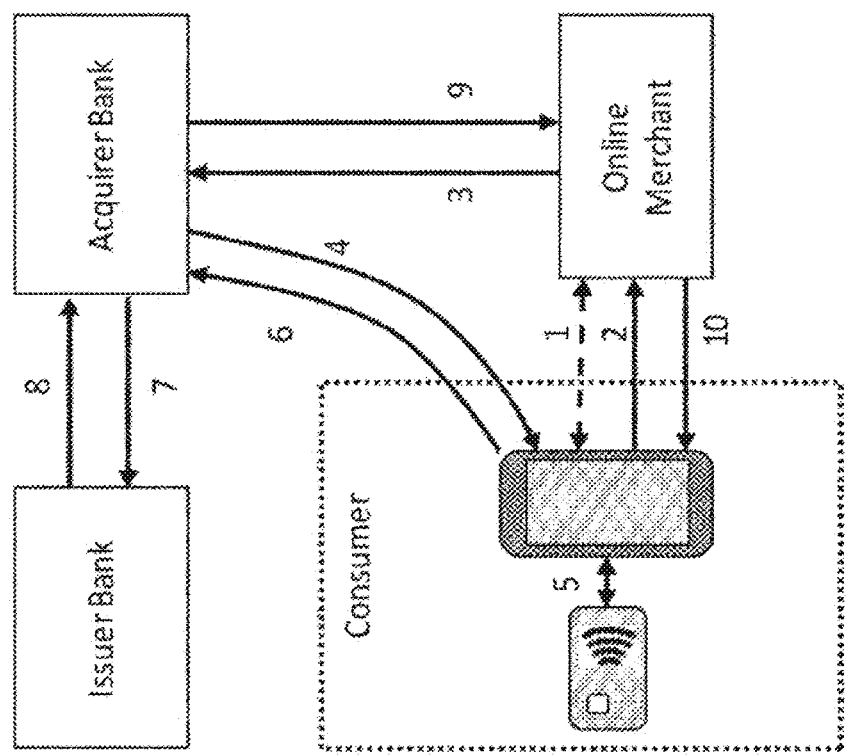

REMOTE TRANSACTION SYSTEM, METHOD AND POINT OF SALE TERMINAL

FIELD OF THE INVENTION

The present invention relates to a system, method and a Point-of-Sale (PoS) terminal that are particularly applicable for use in transactions in which the purchaser is remote of a merchant.

BACKGROUND TO THE INVENTION

Online shops and merchants often accept credit and debit cards as a method of payment. One problem with online card payments is that the user must enter the card information manually into the fields on a page on, or associated with, the online shop's web site.

An online card payment as described above is so called 'card not present' transaction because the merchant can't verify the existence of the physical card at the moment of the transaction. Card not present transactions can be faked easily and the risk for the merchant is high. Consequently the related transaction fee is high.

For example, there is no guarantee that the user is entering his/her own card information, i.e. the card information can be stolen or otherwise fraudulent and can lead to financial losses of the merchant and/or of the consumer. The information sent to the website could be misused for fraudulent transactions by anyone who have access to that information or by a 'middle-man' who can detect the information from the communication between the user and the web site. There are several ways this can be achieved.

Various mechanisms for securing card not present transactions have been suggested. Often, these either do not substantially increase security or else require significant modification to existing infrastructure and online websites due to incompatibility with existing systems. Typical Point of Sale (PoS) terminals are not suitable for use by an end user in their home or other location for a card not present transaction because each POS terminal is configured for a specific merchant. When a purchaser makes a payment in-store, the PoS terminal remits payment to a pre-configured bank account. It is unrealistic to expect each customer to have a POS terminal for every single online merchant he or she may wish to use in order for payment to be remitted to the appropriate merchant's bank account.

STATEMENT OF INVENTION

According to an aspect of the present invention, there is provided a remote transaction processing system including a first data store, the first data store including a user device profile for a user device, the user device profile including routing data for routing communications to the user device; wherein, upon receiving a payment request designating a user device for a transaction with a merchant, the remote transaction processing system being arranged to retrieve a Point-of-Sale, PoS, configuration profile corresponding to the merchant and retrieve the user device profile from the first data store corresponding to the designated user device, the remote transaction processing system being arranged to communicate a PoS configuration dependent on the PoS configuration profile to the user device in dependence on the routing data, the PoS configuration being executable by the user device to cause the user device to act as a PoS terminal for the transaction with the merchant.

Preferably, the user device profile includes a public key of a cryptographic keypair of the user device, the remote transaction processing system being arranged to encrypt the communicated PoS configuration using the public key.

Preferably, the routing data includes a plurality of routes for communicating with the user device, the remote transaction processing system being arranged to determine a route from the plurality of routes for communicating with the user device.

The routes in the routing data may be ranked, the remote transaction processing system being arranged to identify a route to reach the user device in dependence on the ranks.

Preferably, the routes include routes to communicate with the user device over different channels.

The channels may be selected from a set including: SMS, instant messaging, a communication to a predetermined address on a data communications network or a data call over a communications network.

The system may further comprise a second data store, the second data store including a point-of-sale, PoS, configuration profile for each of a plurality of merchants, the remote transaction processing system being arranged to retrieve the PoS configuration profile for the merchant from the second data store.

The second data store may include a PoS certificate associated with the respective merchant, the PoS certificate including the merchant's PoS configuration profile.

The first data store may include a user device certificate associated with the respective user device, the user device certificate including the user device's public key.

The first and second data stores may be the same data store.

The first data store may include a user device profile for each of a plurality of user devices.

The first data store may be remote of the user devices.

The first data store may be local to the user device such that the user device profile may be retrieved from the user device.

The system may include a merchant website, the merchant website including a payment user interface arranged to receive an identifier from a user designating a user device profile to be used for a payment, the remote transaction processing system being arranged to retrieve the user device profile in dependence on the identifier.

The system may include a payment processing system arranged to receive payment requests for each of a plurality of merchants.

The payment processing system may be arranged to receive the PoS configuration profile from the merchant when receiving a payment request.

The system may include a user device, the user device including a PoS terminal application and a payment card reader, the user device being arranged to receive a PoS configuration for a transaction with a merchant, configure the PoS terminal application in dependence on the PoS configuration and to read a payment card via the payment card reader for payment of the transaction via the PoS terminal application.

The user device may include a secure element in which the PoS terminal application is executed, the secure element being selected from a set including: a SIM, UICC, Or ESE (Embedded Secure Element), a Trusted Execution Environment (TEE) or a secure environment.

The secure element may be inserted in, embedded or built in to the user device.

According to another aspect of the present invention, there is provided a remote transaction processing method comprising: receiving a payment request designating a user device for a transaction with a merchant; retrieving a Point-of-Sale, PoS, configuration profile corresponding to the merchant; retrieving a user device profile corresponding to the designated user device, the user device profile including routing data for routing communications to the user device; and, communicating a PoS configuration dependent on the PoS configuration profile to the user device in dependence on the routing data, wherein the PoS configuration is executable by the user device to cause the user device to act as a PoS terminal for the transaction with the merchant.

The method may further comprise associating a cryptographic certificate with the user device profile, the certificate including a public key of a public and private keypair; encrypting at least aspects of the PoS configuration using the public key; and, decrypting the encrypted PoS configuration at the user device using the private key.

The method may further comprise: storing the cryptographic certificate in a data store, the step of retrieving the user device profile including retrieving the certificate.

The step of receiving a payment request may include receiving information on a transaction, the step of communicating a PoS configuration including generating the PoS configuration in dependence on the information on the transaction and on the PoS configuration profile.

The step of generating the PoS configuration may includes signing the PoS configuration using a private key of a private/public cryptographic keypair.

The method may further comprise performing at the user device the steps of: conducting a card payment transaction at the user device by the PoS terminal; signing, at the PoS terminal, payment transaction data; encrypting, at the POS terminal, the signed payment transaction data; transmitting, by the PoS terminal, the encrypted and signed payment transaction data to a payment service host; and deleting, by the PoS terminal, the payment information from the PoS terminal memory. In one or more embodiments, a method of securing all communication from and to and remotely configurable a Point-of-Sale (PoS) terminal system is provided. The method includes PoS terminal cryptographic keys, and a merchant payment system host, using the PoS terminal cryptographic key for encrypting payment information based on a transaction input. The method also includes signing the generated payment information with a private key, and transmitting the signed payment information. The merchant or merchant's payment service provider configures the POS Terminal with merchant's own PoS terminal profile based on instructions transmitted in the payment information.

In one or more embodiments, a method of remotely configuring a Point-of-Sale (PoS) terminal is provided. The method includes receiving, at the PoS terminal, signed payment information. The method also includes validating, at the PoS terminal, the payment information using the public key certificate.

In one or more embodiments, a method of remotely configuring a Point-of-Sale (PoS) terminal is provided. The method includes receiving, at the merchant device, a transaction input. The method also includes generating, at the merchant device, payment information based on the transaction input, and signing the generated payment information with a private key. The method additionally includes transmitting the signed payment information and a public key certificate signed by a certificate authority to the PoS terminal. The method includes validating, at the PoS terminal, the public key certificate using a public key certificate of the certificate authority, and validating, at the PoS terminal, the payment information using the certificate authority-signed public key certificate. The method also includes configuring, at the PoS terminal, a terminal profile of the PoS terminal according to instructions received in the payment information when the payment information is validated at the PoS terminal.

Payment information and the first public key certificate before transmitting the signed payment information and the first public key certificate using a second public key certificate of one of the PoS terminal and an acquiring bank.

BRIEF DESCRIPTION OF THE DRAWINGS

Embodiments of the present invention will now be described, by way of example only, with reference to the accompanying drawings, in which:

FIG. 4 is a schematic diagram illustrating security clearance issuance and configurating of a temporary PoS terminal profile without using an acquiring bank;

FIG. 5 illustrates transaction messages with an online consumer using a separate terminal for shopping and a mobile device for payment; and, FIG. 6 illustrates transaction messages with an online consumer using a mobile device for shopping and for payment

DETAILED DESCRIPTION

Figure 1:
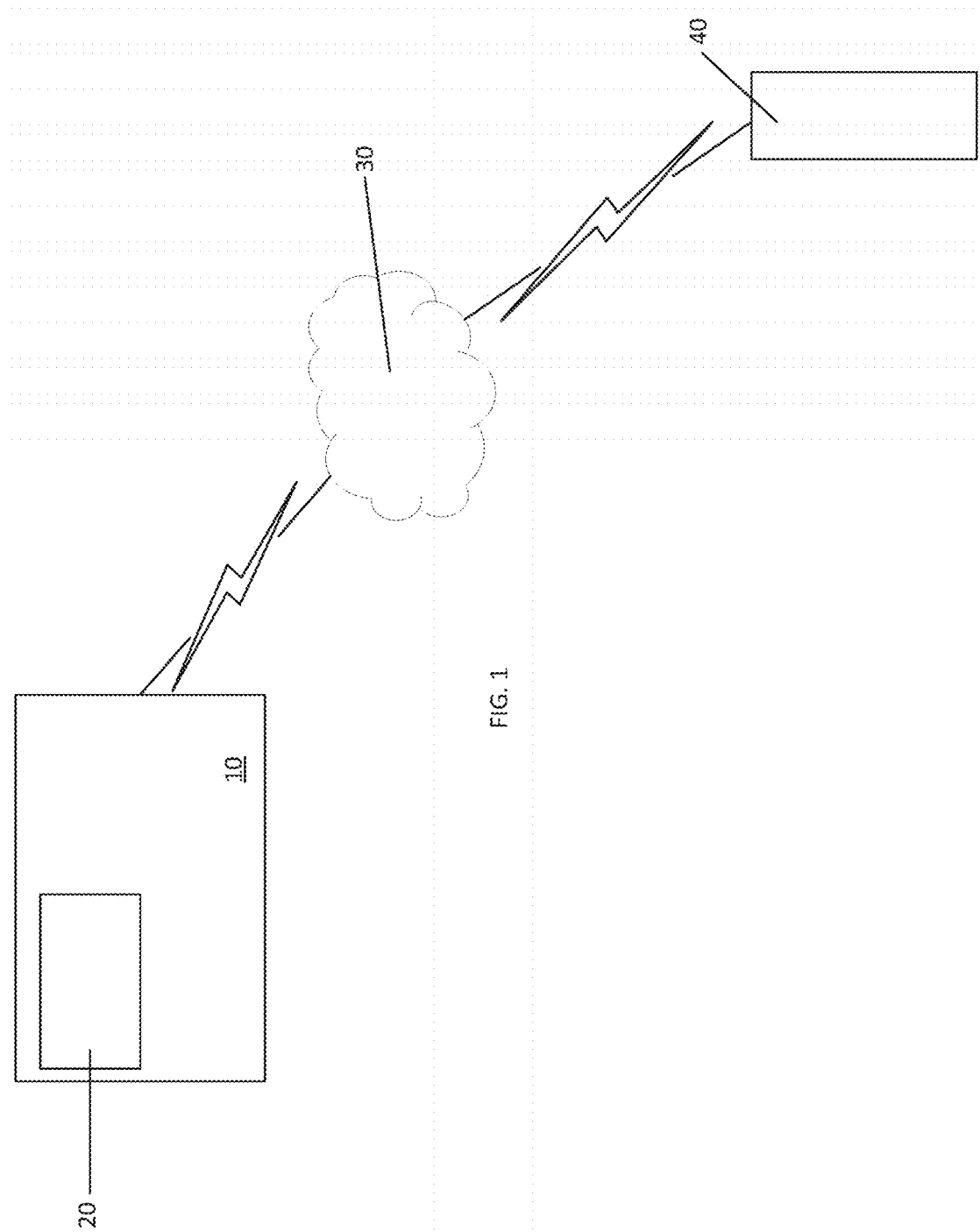
FIG. 1 is a schematic diagram of a remote transaction processing system according to an embodiment of the present invention.

Reference will now be made in detail to the preferred embodiments of the present invention, examples of which are illustrated in the accompanying drawings, wherein like reference numerals refer to like elements throughout.

FIG. 1 is a schematic diagram of a remote transaction processing system according to an embodiment of the present invention.

The remote transaction processing system 10 includes first data store 20.

The first data store 20 includes a user device profile for each of a plurality of user devices, each user device profile including routing data for routing communications to the user device.

Upon receiving a payment request designating a user device 40 for a transaction with a merchant, the remote transaction processing system 10 is arranged to retrieve the PoS configuration profile corresponding to the merchant and retrieve the user device profile from the first data store 20 corresponding to the designated user device 40. The remote transaction processing system 10 communicates a PoS configuration dependent on the PoS configuration profile to the user device 40 via a data communications network 30 in dependence on the routing data. The PoS configuration is executable by the user device 40 to cause the user device to act as a PoS terminal for the transaction with the merchant.

Optionally, the remote transaction processing system 10 may include a second data store. The second data store includes a point-of-sale, PoS, configuration profile for each of a plurality of merchants and is accessed by the remote transaction processing system 10 to retrieve the merchant's PoS configuration profile.

The first and second data stores may be separate or combined. They also may be distributed or replicated data stores.

Preferably, each of the PoS configuration profile and the user device profile are, or include, a cryptographic certificate such as a PKI certificate. Examples of the data that may be included in the cryptographic certificates are discussed below.

Figure 2:
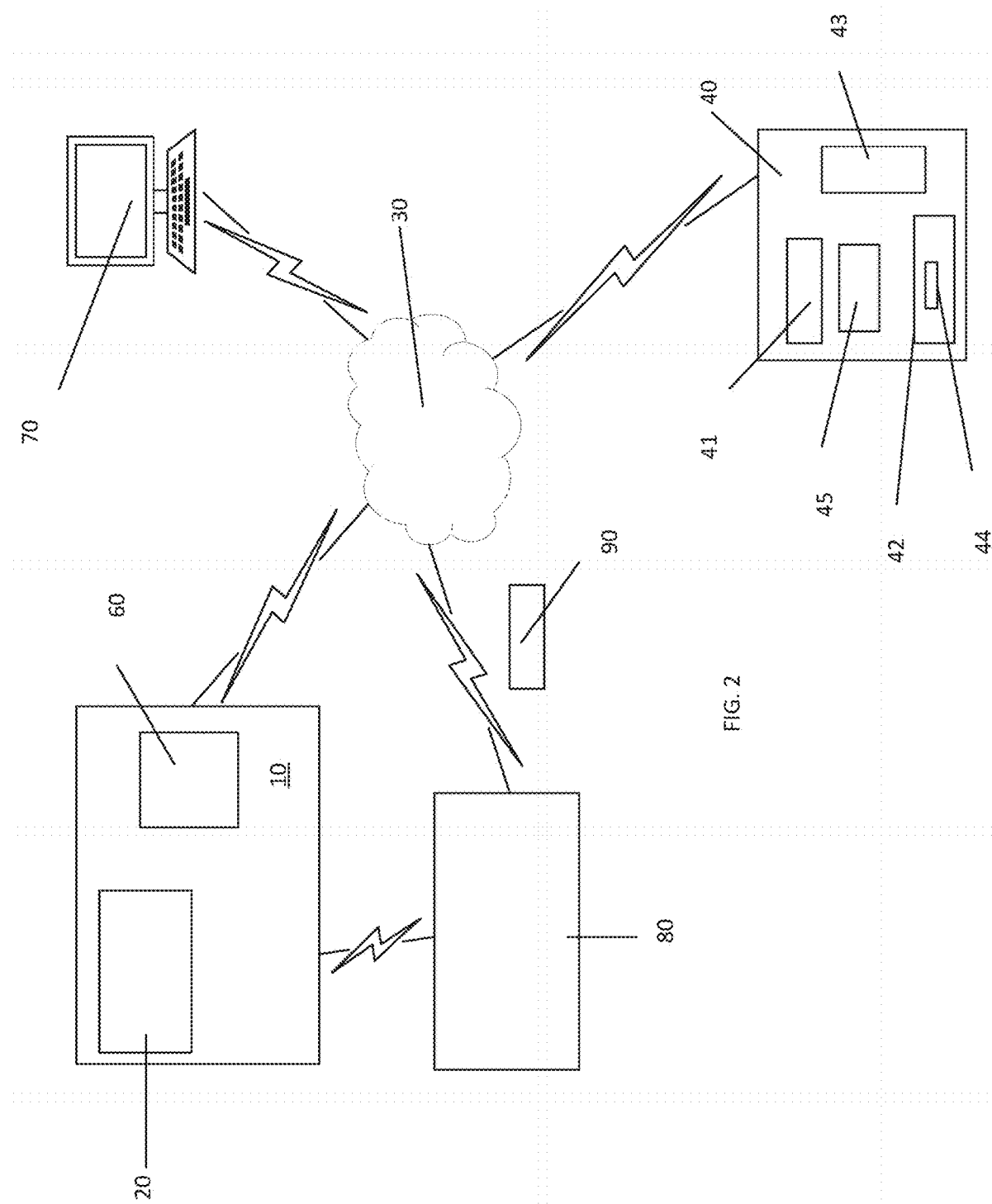
FIG. 2 is a schematic diagram of aspects of the system of FIG. 1 in operation.

FIG. 2 is a schematic diagram of aspects of the system of FIG. 1 in operation.

The user device 40 is, in this embodiment, a smartphone and includes a processor 41, a memory 42, a card reader 45 and a display 43. The user device 40 is arranged to communicate with a data communications network 30.

A user interacts with a website 60 and reaches a stage of needing to make a payment in an online transaction with the merchant associated with the website. In this embodiment, the user is accessing the website 60 via a computing device 70 that is different to the user device 40, although it will be appreciated that the user may be accessing the website 60 via the user device 40.

The website 60 presents the user with payment options in a user interface. Instead of inputting a credit card or debit card as would normally take place at this stage in a transaction, the user enters an identifier for the user device 40.

Upon receiving the identifier, the website 60 communicates this and a merchant identifier to a payment processing system 80.

The payment processing system 80 accesses the first data store 20 to retrieve a PoS configuration profile corresponding to the merchant identifier and the second data store 30 to retrieve a user device profile corresponding to the identifier.

The payment processing system then generates a PoS configuration 90 based on the retrieved PoS profile which it communicates to the user device 40 using routing data from the retrieved user device profile.

Upon receipt of the PoS configuration 90, the processor 41 of the user device 40 executes a PoS terminal application 44 in its memory 42 and applies the PoS configuration which causes it to act as a PoS terminal for the merchant. The user is prompted to present a payment card to the card reader 45 and data from the presented card is processed by the PoS terminal and communicated to a payment processing system 100 for completion of the transaction. At this stage, the transaction appears to the payment processing system to originate from a PoS terminal for the merchant, much as if it had been completed entirely in store with the merchant's own PoS terminal.

The routing data preferably includes a plurality of routes for communicating with the user device 40. The payment processing system 80 preferably is arranged to determine a route from the plurality of routes for communicating with the user device. For example, routes in the routing data may be ranked (or assessed at the time of needing to be used for ranking). The payment processing system may be arranged to identify a route to reach the user device in dependence on the ranks.

The routes preferably include routes to communicate with the user device over different channels. For example, the channels may be selected from a set including: SMS, instant messaging, a communication to a predetermined address on a data communications network or a data call over a communications network.

For example, a user device profile may specify a google messenger address as a preferred route with a Skype address as first fallback and SMS to the mobile device's number as a second fallback. On wishing to communicate a PoS profile, the payment processing system 80 attempts first to communicate with the device via Google messenger, then attempts to do so over Skype before sending an SMS message. In the case of SMS and other payload limited communication mechanisms, either multiple messages may be used or else the message may include a link or other parameters directing the user device to retrieve the PoS profile.

The routing data may include an MSISDN (phone) number, a pseudonym, a device identifier (IMEI for example), a secure element identifier (IMSI for example), an email address, an Internet address, a digital communication network address or Bluetooth address of the user device.

The PoS configuration profile may be in the form of, or include, a certificate and may, for example, include one or more of: a cryptographic signature verifying the content of the certificate; banking and/or payment processing data for use by the PoS terminal application in remitting transaction information such as payment details to the payment processing system 80.

The PoS configuration may include information to be used by the PoS terminal application on the user device to determine whether or not a successful cardholder verification is required to conduct the transaction associated to the received payment information.

The PoS configuration may include information about supported cardholder verification methods.

The PoS configuration may include payment information including one or more of the date, the time, the amount, the currency, floor limit, contactless limit, transaction limit, transaction identifier, merchant name and the merchant's country.

The PoS configuration profile may include one or more of the Payment Service Provider Identification (PSPID), Merchant Identification (MID) code and/or a Terminal Identification (TID) code.

The user device profile may be in the form of, or include, a certificate and may include one or more of a public key of a cryptographic keypair of the user device, IMSI of the user device, MSISDN (phone) number of the user device, an identity of a cellular network service provider, an identifier of the secure element, an identifier of the mobile device, allowed currencies, forbidden currencies, maximum purchase value, high value purchase with cardholder verification supported indicator, maximum purchase value, minimum purchase value, validity period, identification of an allowed mobile device, list of supported card brands, PoS application software version number, financial risk management information.

Preferably, the user device is a mobile device such as a mobile telephone, smartphone, tablet or other computing device. It may be a multi-purpose device (so a smartphone with an appropriate app or other hardware/software/firmware for acting as a PoS terminal) or it may be a dedicated device for providing PoS functions to a user when making remote transactions. Preferably, the user device includes a card reader such as a chip and pin, magnetic stripe and/or a short distance communication (NFC etc) antenna, a display, a memory, a processor, a processor executable programme, a power supply, a radio frequency transmitter, a mobile telephony antenna or other network connector and a method for user input, such as a keypad, touchscreen, camera, and/or microphone.

The user device's cryptographic keypair may be generated within the user device or may be assigned to the user device. The cryptographic keypair may be stored in the user device during manufacture.

The user device may communicate over one or more of a cellular network, Bluetooth or other short distance radio frequency communication, Internet, local area network, wireless local area network, camera embedded in the mobile device, cable connected to the device, microphone or memory card.

The payment processing system 80 preferably is arranged to encrypt the communicated PoS configuration using the public key from the user device's profile.

Preferred embodiments enable a user device to act as a PoS terminal. In preferred embodiments, secure, remote transaction processing is made possible, preferably with a merchant profile being only temporarily assigned and stored in a user device acting as a PoS terminal, allowing such temporary merchant profile to be used for the duration of a specific transaction. While the temporary merchant profile is activated and in use, the user device implements a PoS terminal that acts as a remote PoS terminal of the merchant where the paid amount will be credited into the merchant's account as described in the temporary profile. Once the specific transaction has been completed, the temporary profile will preferably be deleted and therefore the terminal cannot be used until it receives a new profile and transaction input.

As will be appreciated, in preferred embodiments, the buyer does not need to enter his/her payment card information anywhere and therefore, the card information could not be used for fraudulent.

The point of sale application 44 may be implemented as discussed in U.S. Patent App. No. 61/726,121, the content of which is incorporated herein in its entirety. The application 44 may be implemented in hardware, firmware, software or some combination thereof and may reside in a UICC/SIM card. It can be compliant with EMV payment card schement and use Public Key Infrastructure (PKI) type of security certificate based solution.

Preferred embodiments enable secure online payments to be made using chip cards or a mobile wallet. In preferred embodiments, the PoS application (which may reside in a secure chip card memory or in the user device) having a smart card reader or a proximity communication feature such as Near Field Communication (NFC) card reader interface and a network communication capability.

Preferably, secured certificates are used based on Public Key Infrastructure (PKI). The security key management chain integrity enables the creation and maintenance of high security levels within the system.

Security Management

There are several scenarios to manage the security. The first one is with a Merchant, Acquiring bank, Certificate Authority ('CA', for example a Card Scheme) and the Buyer. The second scenario contains a Merchant, Certificate Authority (CA) and the Buyer. The third scenario includes also a trusted third party which manages and operates a PoS certificate database.

The user device, optionally via the PoS application, generates and/or uses a cryptographic keypair; a secure private key and a corresponding public key. The keypair can be dedicated to the PoS application or it can be shared with other applications running in the same processor and/or secure element.

The user device preferably stores the private key in a secure tamperproof memory or in a secure element. This method guarantees the private key is kept in absolute secrecy and is never readable or otherwise exposed outside of the secure element.

The user device preferably creates or uses a public key certificate (user device profile certificate), publishes and transmits its into an external certificate database host (prior to the first payment transaction). In the embodiment of FIG. 1, this is (or is in communication with) the first data store such that the certificate is accessible from the first data store. Optionally, the certificate may be retrieved directly from the user device without being stored in a database.

As discussed above, the payment processing system (such as a payment service host) can retrieve the user's mobile device's certificate from the certificate database using the MSISDN or similar unique device or user identification.

The payment processing system may optionally validate the retrieved user device certificate to determine the consumer's mobile device has a compatible PoS application and it is allowed to conduct the transaction.

The payment processing system preferably uses the public key from the certificate to encrypt the payment information partially or completely prior to transmitting it to the PoS terminal or to a gateway host.

The payment processing system can optionally include return routing information, such as network IP Address, server identifier, domain name in the communicated PoS profile in order to receive information about transaction information such as authorization request and completed transactions.

Preferably, the PoS application on the user device is able to verify that the Merchant's PoS configuration profile it receives is valid and that it has not been altered. This can be achieved by using a PKI security solution inheriting the trust from a common CA. For this purpose, the CA's Public Key Certificate is distributed to the PoS Terminal typically at the time of manufacturing, but it could be done at a later stage.

In both scenarios prior to the first step, the Buyer has already completed the online shopping, the complete Payment Info is therefore known, and user has selected the option to pay with a mobile device with a secured PoS terminal functionality and entered his/her mobile device number.

The merchant host provides a means for the buyer to enter its phone number or other identification or it forwards the buyer to a payment page at payment service host for the same. The user identification code can be stored in a cookie or to similar on the buyer's computing device and automatically filled in to the relevant field on the payment page. This allows the buyer to use a "one-click purchase" method without typing any credit card information at all.

1. The buyer selects the payment method to use remote PoS terminal on their mobile device.
2. Merchant forwards the payment information to a payment service host operated for example by a payment acquirer or a payment service provider (PSP).
3. The buyer enters their mobile device number (MSISDN) or similar unique identification on the page on the payment service host.
4. The payment service host retrieves a user device profile certificate from the certificate database host corresponding to the input from the buyer.
5. If the retrieval was successful, the PSP validates the certificate and determines whether or not the mobile device is equipped with a compatible version of a PoS terminal.
6. The PSP signs the payment information.

7. The PSP encrypts the payment information using the PoS terminal's public key.
8. If the Payment Information is valid, the PoS will configure its terminal profile according to the instructions received in the Payment Information for duration of one transaction.
9. The PoS presents the payment instructions to the user.
10. The user can accept the payment or reject it.
11. If accepted, the payment will be processed according to the relevant method.
12. When the payment processing has been completed, the PoS terminal will automatically delete its profile and can't be used anymore until it received new payment information.

Figure 3:
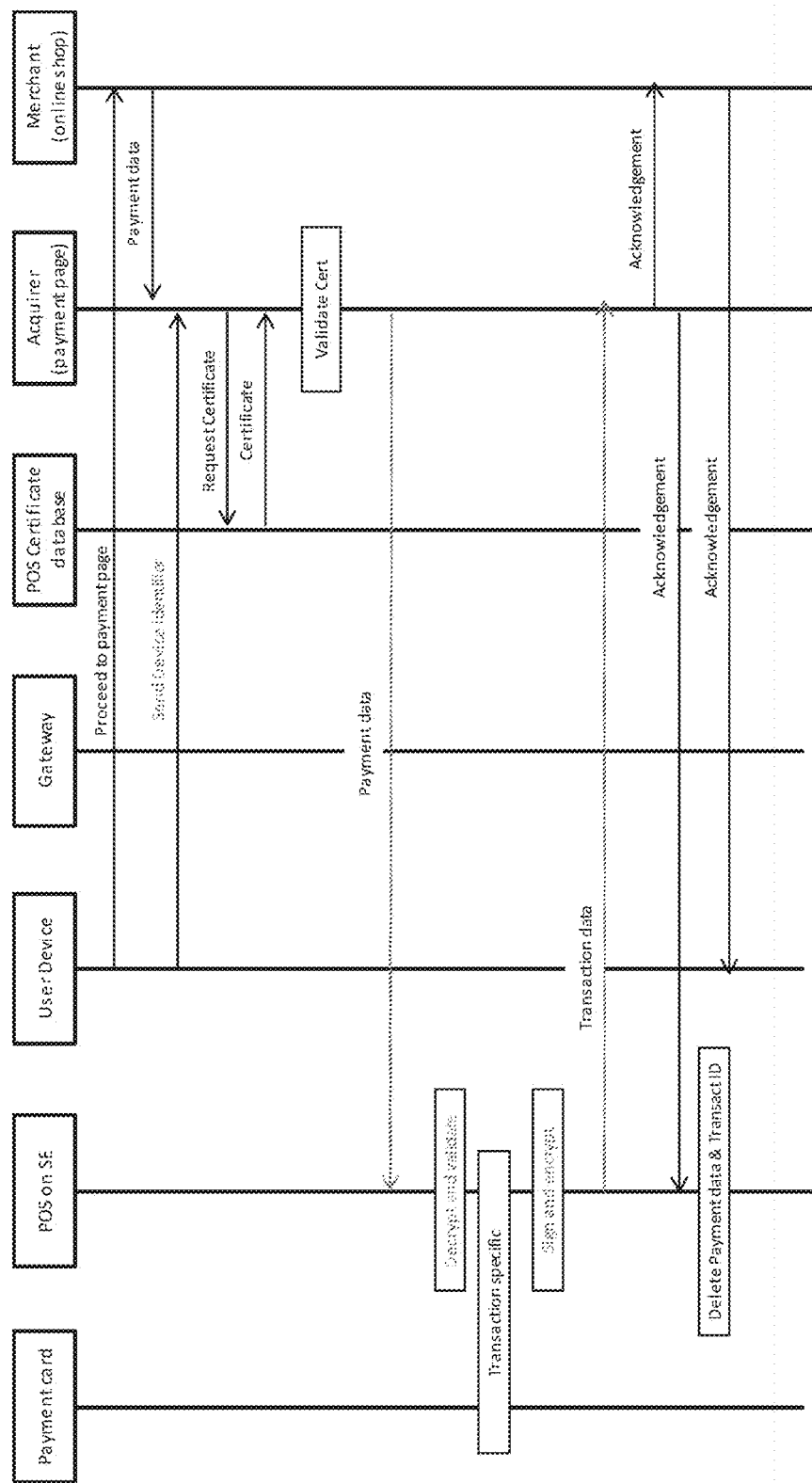
FIG. 3 is an illustration of a transaction flow with a merchant transmitting the payment information to a mobile user device executing a PoS application (and thereby becoming a PoS terminal)

Turning to FIGS. 3 and 4, an embodiment of the present invention is illustrated in a transaction flow diagram and a schematic diagram. The transaction flow diagram of FIG. 3 illustrates a transaction flow with a merchant transmitting the payment information to a mobile user device executing a PoS application (and thereby becoming a PoS terminal). The transaction flow diagram of FIG. 4 illustrates a schematic diagram illustrating security clearance issuance and configurating of a temporary PoS terminal profile without using an acquiring bank. The system includes a merchant device and a certificate authority, without an acquiring bank. In the embodiment without the acquirer bank, the following operations may occur:
1. Merchant signs the Payment Information (PI) with its Private Key.
2. Merchant sends the signed PI and Merchant's Public Key certificate signed by a CA to a PoS terminal.
3. PoS terminal validates the Merchant's Public Key certificate using CA's Public Key certificate.
4. If the Merchant's certificate is valid, the PoS will use it to validate the PI.
5. If the PI is valid, the PoS will configure its terminal profile according to the instructions received in the PI for duration of one transaction.
6. The PoS presents the payment instructions to the user.
7. The user can accept the payment or reject it.
8. If accepted, the payment will be processed according to the relevant method.
9. When the payment processing has been completed, the PoS terminal will automatically delete its profile and can't be used anymore until it received new payment information.

There could be also other scenarios with the same level of security provided by an unbroken chain of security certificates.

The selection of these scenarios is invisible to the user. The main difference is in handling the data traffic to the mobile devices, in other words, whether the Merchants need to be able to manage the data communication between their system and various mobile devices, or will this complexity concentrated at and performed by the Acquiring Banks.

Transaction Message Flow

FIG. 5 illustrates transaction messages with an online consumer using a separate terminal for shopping and a mobile device for payment. FIG. 6 illustrates transaction messages with an online consumer using a mobile device for shopping and for payment.

When ready to pay the products or services (1), the user can enter his/her mobile device number at the online merchant site (2) as the payment card number. The merchant server will generate a Payment Information with all necessary information about the transaction, including but not limited to the merchant's PoS terminal profile, such as primary account number and other information, risk management information, payment processing information, information about accepted card type(s), a list of country codes where the mobile PoS terminal is allowed to perform the transaction, a list of country codes where the mobile PoS terminal is not allowed to perform the transaction, date and time of the purchase, name of the merchant and the amount as well as the user's mobile device number. The Payment Invoice will be signed by the Merchant's own private key, which is signed by a trusted third party, like a bank, a payment card scheme, a Certificate Authority or similar, and sent to an Acquiring Bank (3) which will check the authentication and integrity of the Payment Invoice. If the Payment Invoice is valid, the CA will sign it with its own Private Key and send it to the secure PoS terminal application (4) at the user's mobile device or in the UICC/SIM card in the mobile device.

The data transmission function can be performed by a trusted service manager or other trusted third party. The transmission can use any available communication protocol, such as Instant messaging, SMS, USSD, TCP/IP or CSD, which is supported by the used network and the mobile device and the UICC card which may reside in it.

A trusted third part like CA or a bank may hold a database linking the account number to a mobile device number.

The PoS terminal will receive the signed Payment Invoice and will check the integrity and authentication of the Payment Invoice using a Public Key of a CA, trusted third party or a payment card scheme, which resides in its secure memory.

The PoS terminal will preferably determine its geographical location using for example available network information about in which country it resides and compare the location information with the list of allowed and banned country codes. It the current geographical location of the PoS terminal is not within the allowed locations or if it is in a banned location, the PoS terminal will cancel the transaction and the user and the bank may be informed.

If the Payment Information is valid, the PoS terminal will use the information in the Payment Information to configure itself to act as if it were a PoS terminal belonging to the Merchant.

The Payment information includes the amount to be paid as a fixed amount which can't be entered or otherwise modified by the user.

The user may be notified about the online pending transaction and asked for a permission to continue with the transaction. The user may either cancel or accept the transaction 'as is', but the user cannot change the amount or any other settings or information related to the transaction.

The PoS terminal will display the amount, the name or other identification of the merchant and potentially other transaction related information and ask for the user's acceptance. If the transaction is accepted by the user, the PoS terminal will ask for a payment card to be presented in the card reader. In case of multiple cards or card readers, the PoS terminal will ask the user to select the card and card reader interface to be used.

The card reader can be integrated in the PoS terminal/mobile device or it can be an external card reader connected to it. The card reader can be contact or contactless type.

Once the payment card is communicating with the card reader embedded in or connected to the mobile device (5) in order to complete the transaction, the user may be asked to provide information he/she knows like a secret PIN code (or another authentication like a signature, picture, voice sample or a photo, etc). The PIN code or other authentication information can be entered for example using the mobile device's user interface display, a keypad, a camera, a voice recognition feature, a character detection feature or a motion detection feature and a fingerprint recognition.

The transaction between the payment card and the PoS terminal can be for example an EMV standard transaction, a contactless payment transaction, a smart card transaction, an embedded payment card transaction, a credit or a debit card transaction, a transaction using an account for example at a network operator, a prepaid or a stored value or a purse card transaction.

The payment card can be a physically separate payment card or it can reside in the same UICC card or in the same mobile device as the PoS terminal. The payment card can reside in a Mobile Wallet which is in the mobile device or in the UICC/SIM card. The payment card can reside in the same Integrated Circuit (IC) as the PoS terminal or it can be in a separate IC. One or both of the ICs can be embedded in a UICC/SIM card or a mobile device. The IC containing the payment card can be embedded in the mobile device and the IC containing the PoS terminal can be embedded in the UICC card, and vice versa.

UICC card can be a SIM card and/or a Secure Element.

If a Mobile Wallet is used and it contains more than one payment card, the user can select which payment card he/she wants to use.

The payment transaction will be sent back to the payment acquirer, which will check the validity of the transaction with the card issuer 7-8) and confirm the transaction status to PoS terminals and to the Online Merchant (9). The Online Merchant can confirm the transaction status to the Consumer (10). If the transaction was completed successfully, the funds will be transferred to the Merchant's account.

If the transaction was not approved, the user may cancel the transaction or retry with the same or different payment card or card reader.

Once the transaction has been processed and the transaction has been completed, the Merchant specific configuration and payment information will be deleted permanently.

The present embodiments enable secure online purchases using a NFC compatible mobile device and a UICC card as a PoS terminal for both the merchant and the buyer.

The PoS terminal can be any network connected PoS terminal.

The payment service host can be also a software application or hardware implementation in a mobile device or a SIM card. In this case, the Seller's PoS terminal application in the mobile device or in the SIM card could send its own terminal profile to the buyer's PoS terminal application to conduct a secure financial transaction to be routed from the Buyer's account to the Seller's account.

Address Database

The PoS terminal application, the PoS configuration database or PoS terminal public key certificate can hold a database of one or more street or other physical addresses. The addresses can be used for example as an invoicing and/or delivery address for a remote purchase of goods. The address can be combined with the information send to the acquiring bank and/or to the merchant. The address information can be signed by the PoS terminal using its Private Key for authentication and encrypted by using the merchant's or acquiring bank's Public Key for security purposes.

The address database can have fixed addresses the user can't change and additional addresses the user can modify.

The addresses can be marked with various purposes, like 'delivery address', 'invoicing address', 'home address', 'work address', 'PoS terminal holders address' to name a few. If an address is included in the data sent to the acquiring bank and/or to the merchant and it has been marked as 'delivery address', the merchant shall use that address as the delivery address for the goods. If the address is marked as 'invoicing address' the merchant shall send the invoice related to the purchase to that address.

Aspects of the present embodiment(s) can also be embodied as software configured to be used with a processor to cause the processor to perform operations, or can be embodied as hardware on one or more connected or unconnected devices.

While the preferred forms and embodiments of the invention have been illustrated and described, it will be apparent to those skilled in the art that various changes may be made without deviating from the inventive concepts set forth above.

The invention claimed is:

1. A remote transaction processing system comprising:
   a plurality of user devices, each of the plurality of user devices including a payment card reader and a secure memory element storing a Point of Sale (PoS) terminal application;
   a first data store including a user device profile for each of the plurality of user devices, each of the user device profiles including routing data to route communications to the user device; and
   a payment service host including a processor configured to execute computer program code to receive payment requests for each of a plurality of merchants for payment for a transaction initiated at a respective merchant site or website, the payment service host being configured, upon receiving one of the payment requests designating one of the user devices for the respective transaction with one of the plurality of merchants, to execute program code to retrieve a PoS configuration profile corresponding to the merchant and retrieve the user device profile including the routing data from the first data store corresponding to the designated user device,
   the payment service host being configured to generate a PoS configuration based on the PoS configuration profile, the retrieved user device profile, and payment information on the transaction including the amount to the user device and communicate the generated PoS configuration to the user device using the routing data from the retrieved user device profile,
   wherein the user device is configured to receive the PoS configuration communicated from the payment service host for the transaction with the merchant, to execute the PoS terminal application in the secure memory element, to configure the PoS terminal application in dependence on the received PoS configuration, and to communicate with a payment card via the payment card reader for payment of the transaction with the PoS terminal application to thereby act as a PoS terminal of the merchant on the user device for the transaction with the merchant.

2. The system as claimed in claim 1, wherein each of the user device profiles includes a public key of a cryptographic keypair of the user device, the remote transaction processing system being configured to encrypt the communicated PoS configuration using the public key.

3. The system as claimed in claim 1, wherein the routing data includes a plurality of routes for communicating with the user device, the remote transaction processing system being configured to determine a route from the plurality of routes for communicating with the user device.

4. The system as claimed in claim 3, wherein the routes in the routing data are ranked, the remote transaction processing system being configured to identify a route to reach the user device in dependence on the ranks.

5. The system as claimed in claim 3, wherein the routes include routes to communicate with the user device over different channels.

6. The system as claimed in claim 5, wherein the channels are selected from a set including: Short Message Service (SMS), instant messaging, a communication to a predetermined address on a data communications network, and a data call over a communications network.

7. The system as claimed in claim 1, further comprising a second data store including the PoS configuration profile for each of the plurality of merchants, the remote transaction processing system being configured to retrieve the PoS configuration profile for the merchant from the second data store,
wherein the second data store includes a PoS certificate associated with the respective merchant, the PoS certificate including the PoS configuration profile of the respective merchant.

8. The system as claimed in claim 1, wherein the first data store is remote of the user devices.

9. The system as claimed in claim 1, further comprising a merchant website including a payment user interface configured to receive an identifier from a user designating a user device profile to be used for a payment, the remote transaction processing system being configured to retrieve the user device profile in dependence on the identifier.

10. The system as claimed in claim 1, wherein the PoS terminal application is configured to delete the PoS configuration from the user device after the transaction so that the user device no longer acts as a PoS terminal for transactions with the merchant.

11. The system as claimed in claim 1, wherein the PoS application on the user device is configured to verify that the PoS configuration profile corresponding to the merchant is unaltered.

12. A remote transaction processing method comprising:
receiving, at a payment service host from a merchant website of one of a plurality of merchants, a payment request designating a user device for a transaction with a merchant, the user device including a payment card reader and a secure memory element in which a PoS terminal application is executable by the user device;
retrieving, by the payment service host, a Point-of-Sale (PoS) configuration profile corresponding to the merchant;
retrieving, by the payment service host, a user device profile corresponding to the designated user device from a first data store storing the user device profile, the user device profile including routing data for routing communications to the user device;
generating a PoS configuration based on the PoS configuration profile, the retrieved user device profile, and payment information on the transaction including the amount to the user device; and
communicating the generated PoS configuration to the user device using the routing data from the retrieved user device profile,
wherein the user device is configured to receive and use the PoS configuration profile communicated from the payment service host to cause the user device to act as a PoS terminal and accept a card payment via the card reader for the transaction with the merchant.

13. The method as claimed in claim 12, further comprising:
associating a cryptographic certificate with the user device profile, the certificate including a public key of a public and private keypair;
encrypting at least aspects of the PoS configuration using the public key; and
decrypting the encrypted PoS configuration at the user device using a private key of the public and private keypair.

14. The method as claimed in claim 13, further comprising:
storing the cryptographic certificate in a data store, the retrieving the user device profile including retrieving the certificate.

15. The method as claimed in claim 12, wherein the generating the PoS configuration includes signing the PoS configuration using a private key of a private/public cryptographic keypair.

16. The method as claimed in claim 12, further comprising
performing, at the user device:
conducting the card payment transaction at the user device by the PoS terminal,
signing, at the PoS terminal, payment transaction data,
encrypting, at the PoS terminal, the signed payment transaction data,
transmitting, by the PoS terminal, the encrypted and signed payment transaction data to a payment service host, and
deleting, by the PoS terminal, the payment information from a PoS terminal memory.

* * * * *